No. 784,241. PATENTED MAR. 7, 1905.
R. S. TOWNSEND.
SPROCKET WHEEL.
APPLICATION FILED AUG. 18, 1904.

Richard S. Townsend, Inventor,

By E. G. Siggers

Attorney

Witnesses
Howard D. Orr
B. G. Foster

No. 784,241.

Patented March 7, 1905.

UNITED STATES PATENT OFFICE.

RICHARD SIDNEY TOWNSEND, OF UNION CITY, MICHIGAN.

SPROCKET-WHEEL.

SPECIFICATION forming part of Letters Patent No. 784,241, dated March 7, 1905.

Application filed August 18, 1904. Serial No. 221,271.

*To all whom it may concern:*

Be it known that I, RICHARD SIDNEY TOWNSEND, a citizen of the United States, residing at Union City, in the county of Branch and State of Michigan, have invented a new and useful Sprocket-Wheel, of which the following is a specification.

It is a well-known fact that the rim and teeth of a sprocket-wheel are the only parts subjected to material wear; and the object in the present invention is to provide a novel structure wherein said parts can be readily replaced by new ones without the necessity of renewing the entire wheel, the connections between the parts being strong and durable and the rim being thoroughly and uniformly braced and supported.

Figure 1:
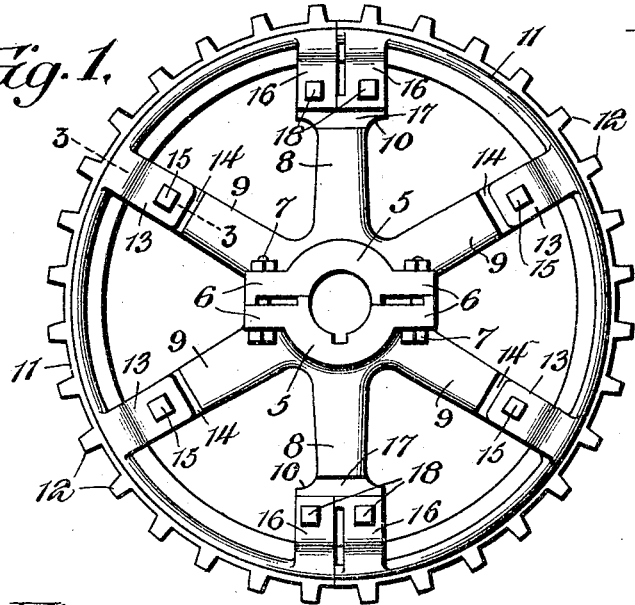
Figure 3:
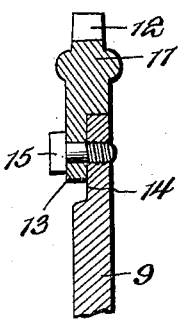
Figure 2:
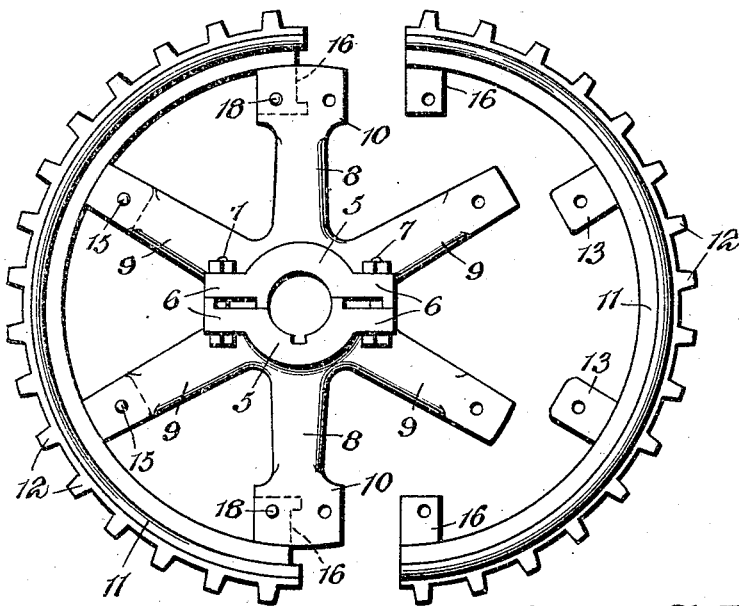
Figure 4:
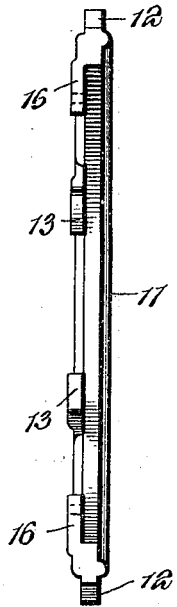

In the accompanying drawings, Figure 1 is a side elevation of a sprocket-wheel constructed in accordance with the present invention. Fig. 2 is a view in elevation of the opposite side and showing one of the rim-sections detached. Fig. 3 is a detail sectional view on the line 3 3 of Fig. 1. Fig. 4 is an edge view of one of the rim-sections.

Similar reference-numerals indicate corresponding parts in all the figures of the drawings.

In the embodiment illustrated a hub is employed comprising sections 5, arranged to embrace a shaft and having oppositely-extending ears 6, secured together by suitable means, as bolts 7. Each section has radially-disposed spokes 8 and 9, which are preferably of substantially equal size throughout the main portion of their lengths, the intermediate spokes 8, however, having their outer ends enlarged, as shown at 10. The adjacent end spokes 9 of the hub-sections are located in divergent relation, so that their outer ends are spaced apart, the distance between the outer ends of all the spokes being substantially the same.

The rim is made up of sections 11, carrying teeth 12 on their outer sides and having inwardly-extending flanges on their inner sides of less width than the outer portions and adapted to abut against the ends of the spokes 8 and 9, said outer ends being preferably curved, as illustrated in Fig. 2. The sections have spaced intermediate and inwardly-extending ears 13, which are offset at one side of said sections, as shown in Fig. 4, constitute reinforcements for the flanges, and extend inwardly beyond the same, being adapted to rest flat against the sides of the end spokes 9, said spokes being each provided with a flat seat 14, that receives the ears. Screw-bolts 15, passing through the ears 13, are threaded into the ends of the spokes 9, and thus constitute fastening means for connecting intermediate portions of the rim-sections to the end spokes 9 of the hub-sections. The ends of the flanges of the rim-sections are preferably abutted directly against the ends of the intermediate spokes 8 and have inwardly-extending reinforcing-ears 16, that project inwardly beyond the flanges and rest against the sides of said spokes 8, which spokes are provided with seats 17, constituting bearings for the ears. The ears 16 are offset at one side of each section in a manner similar to the intermediate ears 13, and they are detachably connected to the spokes 8 by screw-bolts 18.

It will be apparent that with this structure when the rim of the wheel has become worn or should it become injured it may be readily removed and replaced by a new one without disturbing the body of the wheel and without the necessity of removing it from its shaft. While the rim can be easily removed, when it is in place it is securely fastened, and it is braced and supported at equal distances by means of the radiating spokes, which spokes can be made of normal size. It is to be observed, moreover, that the joints between the hub-sections are bridged by the rim-sections, while in like manner the joints of the rim-sections are bridged by the intermediate spokes of the hub-sections.

From the foregoing it is thought that the construction, operation, and many advantages of the herein-described invention will be apparent to those skilled in the art without further description, and it will be apparent that various changes in the size, shape, proportion, and minor details of construction may be resorted to without departing from the spirit or sacrificing any of the advantages of the invention.

Having thus described my invention, what I claim as new, and desire to secure by Letters Patent, is—

A sprocket-wheel comprising a hub composed of sections, each section having radially-disposed spokes, the adjacent spokes that are located at the correlated ends of said hub-sections being arranged in divergent relation with their outer ends spaced apart, means for securing the hub-sections together, rim-sections having inwardly-extending flanges, the inner faces of which are abutted against the outer ends of the spokes, the corresponding ends of said rim-sections being abutted and respectively located at the intermediate spoke of one of the hub-sections, transverse reinforcing-ears carried by the flanges, said ears lying longitudinally alongside the outer ends of the spokes, and fastening devices detachably securing the spokes and ears together.

In testimony that I claim the foregoing as my own I have hereto affixed my signature in the presence of two witnesses.

RICHARD SIDNEY TOWNSEND.

Witnesses:
A. LUNDTEIGEN,
WM. M. HATCH.